US006853682B2

(12) United States Patent
Min

(10) Patent No.: US 6,853,682 B2
(45) Date of Patent: Feb. 8, 2005

(54) METHOD AND APPARATUS FOR MOTION COMPENSATION ADAPTIVE IMAGE PROCESSING

(75) Inventor: Cheol Hong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 643 days.

(21) Appl. No.: 09/764,311

(22) Filed: Jan. 19, 2001

(65) Prior Publication Data

US 2001/0010705 A1 Aug. 2, 2001

(30) Foreign Application Priority Data

Jan. 20, 2000 (KR) .......................................... 2000-2674

(51) Int. Cl.$^7$ ............................. H04N 7/12; H04N 7/14
(52) U.S. Cl. ................................................ 375/240.19
(58) Field of Search .......................... 348/384.1, 390.1, 348/402, 401, 409.1, 405.1, 398.1, 399.1, 400.1; 375/240, 240.03, 240.16, 240.18, 240.19, 240.2, 240.21, 240.23

(56) References Cited

U.S. PATENT DOCUMENTS

| | | | | | |
|---|---|---|---|---|---|
| 5,001,561 | A | * | 3/1991 | Haskell et al. | ......... 375/240.02 |
| 5,412,741 | A | * | 5/1995 | Shapiro | ....................... 382/232 |
| 5,764,805 | A | * | 6/1998 | Martucci et al. | ............. 382/238 |
| 5,825,935 | A | * | 10/1998 | Murakoshi | ................... 382/248 |
| 6,160,846 | A | * | 12/2000 | Chiang et al. | .......... 375/240.05 |
| 6,519,285 | B2 | * | 2/2003 | Yamaguchi et al. | ... 375/240.12 |
| 6,532,265 | B1 | * | 3/2003 | Van der Auwera et al. | ...... 375/240.16 |
| 6,553,071 | B1 | * | 4/2003 | Kim et al. | .............. 375/240.19 |

FOREIGN PATENT DOCUMENTS

| EP | 0778709 | * | 6/1997 |
|---|---|---|---|
| EP | 0782345 A2 | * | 7/1997 |
| WO | WO 99/27715 | | 6/1999 |
| WO | WO 99/57908 | | 11/1999 |

OTHER PUBLICATIONS

Gharavi, H. et al., "Sub–Band Coding of Monochrome and Color Images," Feb. 1, 1088, vol. 35, No. 2, pp. 207–214, IEEE Transactions on Circuits and Systems, IEEE Inc., New York, NY.

Taubman, D. et al., "Orientation Adaptive Subband Coding of Images," May 3, 1993, vol. 2, pp. 271–274, Proceedings of the International Symposium on Circuits and Systems, (ISCS), Chicago, IL.

Wilkinson, J. H. et al., "Cascading Different Types of Video Compression Systems," Jul. 1, 1994, vol. 76, No. 6, pp. 128, 131, 134, Image Technology (Journal of the Bksts), British Kinematograph Sound and television Society, London, GB.

Chen, Ting–Chung and Fleischer, Paul E., "Sub–band coding for ATV signals based on spatial domain considerations," Nov. 8–10, 1989, vol. 1199, Part Two of Three Parts, pp. 787–798, Proceedings of SPIE—The International Society for Optical Engineering—Visual Communications and Image Processing IV, 1989.

* cited by examiner

*Primary Examiner*—Chris Kelley
*Assistant Examiner*—Behrooz Senfi
(74) *Attorney, Agent, or Firm*—Fleshner & Kim, LLP

(57) ABSTRACT

A method for motion compensation adaptive image processing, which processes an image data received from an external source, stores the processed image data and restores the stored data to the received image data, the method comprising the steps of analyzing the received image data into image data having relatively high frequency component and relatively low frequency component, compressing/coding the image data having relatively high frequency component and relatively low frequency component by allocating predetermined bits, dividing the compressed/coded image data into a value corresponding to relatively high frequency component and a value corresponding to relatively low frequency component, and decoding the values and restoring the received image data based on the decoded image data.

27 Claims, 6 Drawing Sheets

METHOD AND APPARATUS FOR MOTION COMPENSATION ADAPTIVE IMAGE PROCESSING

BACKGROUND OF THE INVENTION

1. Field of the Invention

The present invention relates to a compression of decoded picture and particularly relates to a method and an apparatus for motion compensation adaptive image processing of the decoded picture data, which is not limited to but can be used in video decoding systems such as ones adopting MPEG video coding standards.

2. Description of the Conventional Art

In order for a real-time VLSI decoder to be cost effective, it is necessary to reduce its resources. There are several ways to reduce the cost but one of them is to use less memory. Other methods could reduce computational complexity, lower its bandwidth usage, and memory more which include implementation issues.

The Advanced Television System Committee (ATSC) adopted the ISO/IEC 18318-2 a.k.a. the MPEG-2 Video Coding Standard which encodes and decodes moving pictures Specially, the Digital Television (DTV) System in the U.S. adopts MPEG-2 MP@HL video coding specification as its standard and specifies 18 different picture formats. Among the many formats, 1920×1082×30 frames/sec requires the most frame memory and bandwidth. To decode this picture size, a decoder requires about 16 Mbytes of memory since external memory is available in specific sizes.

In designing a real-time VLSI decoder, the memory bandwidth is very critical and increases the cost of the chip. Also, due to its large external memory requirement for decoded frame storage it will also increase the cost of its target application, such as PC add-in card or Set-top Box (STB). Therefore, above mentioned factors become critical, making a VLSI implementation inappropriate for consumer electronics.

An HDTV decoder must be able to decode all the 18 formats recommended by the ATSC specification, ATSC DTV video formats, using MPEG Main Profile/Main Level specification, are all in 4:2:0 Y, Cb, Cr mode. The 18 formats are combinations of the followings:

1) 4 different picture sizes, which are, 1920×1080, 1280× 720, 704×480 and 640×480

2) 2 different aspect ratio information, which are 4:3 and 16:9

3) 8 different frame rate codes, which are 23.976 Hz, 24 Hz, 29.97 Hz, 30 Hz, 59.94 Hz, and 60 Hz 4) progressive or interlaced sequences Also, the MPBG-2 video adopted by the ATSC supports 3 different coding modes, which is also called picture coding types. Each of these 3 picture coding types has different characteristics. They are Intra (I), Predictive (P) and Bi-directional (B) picture types. I pictures are coded without reference to other pictures. And they can be used to predict the P and B pictures P pictures are coded using previous I picture or other P pictures as a reference, and the P pictures can predict the future P and B pictures B pictures are coded using I and P pictures from previous and future pictures. But B pictures are not used as a reference FIG. 1 is a schematic block diagram of an image processing apparatus in accordance with the conventional art.

The image processing apparatus in accordance with the conventional art includes a variable length decoder 101 decoding input image data (input bitstreams) as variable length and outputting decoded image data and motion vector signal, a motion compensation unit 106 receiving the motion vector signal from the variable length decoder 101 and outputting motion compensation information to compensate the received image data, a dequantizer 102 dequantizing the variable length decoded image data and generating dequantized image data, inverse discrete cosine transform (IDCT) unit 103 transforming the dequantized image data into inverse discrete cosine transform data, an image frame processing unit 104 processing the inverse discrete cosine transform data as a frame unit according to the motion compensation information, and a memory 105 storing the image data received from the image frame processing unit 104 and outputting the stored image data to the motion compensation unit 106 and a display (not shown).

The decoding procedure of the MPEG-2 Video is in the following order as shown in FIG. 1 Input bit stream is first Variable Length Decoded at the Variable Length Decoder (VLD) 101. From the Variable Length Decoder 101 motion vector information and variable length decoded (VLD) data are outputted to the dequantizer 102. That is, the VLD data is inverse-scanned and dequantized then fed to the IDCT block. Motion vector signals are used to retrieve block data from the reference picture by the Motion Compensator. Finally, the image frame processing unit 104 processes the IDCT data based on the motion compensation information from the Motion Compensator 106 and outputs motion compensated data to reconstruct the input image data. Then, 16 MB of exter pictures, 2 pictures being reference and the other being the B pictures. The Display Controller (not shown) reads pictures from the external memory 105 and displays them on the TV or monitors (not shown).

The Display Controller and Motion Compensator 106 are implemented as the blocks that use most of the bandwidth. Especially for Motion Compensator 106, unlike Display Controller, the memory data needs to be accessed randomly for motion compensation purpose since, motion compensation is done on block i.e., 16×16 or 16×18 pel basis.

Usually, MPEG encodes sequences using combination of I, P and B pictures causing the prediction error to propagate until the error is refreshed by the next I picture. Therefore, the compression scheme must be balanced between random accessibility of the decoded data and moderate compression ratio to meet the compression needs, and also be able to propagate less error.

SUMMARY OF THE INVENTION

The object of the present invention is to provide a method and an apparatus for motion compensation adaptive image processing which is capable of compressing decoded image data as coding them on the low bandwidth, storing them in small memory and restoring the input image data to display high definition quality.

The another object of the present invention is to provide a method and an apparatus for motion compensation adaptive image processing, which is capable of analyzing input image data into image data having relatively high and low frequency components, allocating bits to the analyzed image data, compressing the image data as small and restoring the compressed image data to maintain high definition quality.

To achieve the objects, the present invention provides a method for motion compensation adaptive image processing, which processes an image data received from a external source, stores the processed image data and restores the stored data to the received image data, wherein the method comprising the steps of analyzing the received image data into image data having relatively high frequency component and relatively low frequency component, compressing/coding the image data having relatively high frequency component and relatively low frequency component which predetermined bits are allocated thereto, dividing the compressed/coded image data into a value corresponding to relatively high frequency component and a value corresponding to relatively low frequency component, and decoding the values and restoring the received image data based on the decoding image data.

To achieve the above objects, the present invention provides an apparatus for motion compensation adaptive image process, which processes an image data received from a external source, stores the processed image data and restores the stored data to the received image data, wherein the apparatus comprises an image frame processing unit for processing the received image data as a frame unit and outputting the processed image data and a motion vector signal, an image compensating unit for generating a motion compensation information to compensate the received image data based the motion vector signal and outputting it to the image frame processing unit, an image compressing unit for analyzing image data having relatively high frequency component and image data having relatively low frequency components, allocating a predetermined bits into the analyzed image data and compressing/coding the image data including the allocated bits, a storing unit for the compressed/coded image data, and an image restoring unit for decoding the stored image data and restoring the received image data based on the decoding image data.

DETAILED DESCRIPTION OF THE PREFERRED EMBODIMENTS

Figure 1:
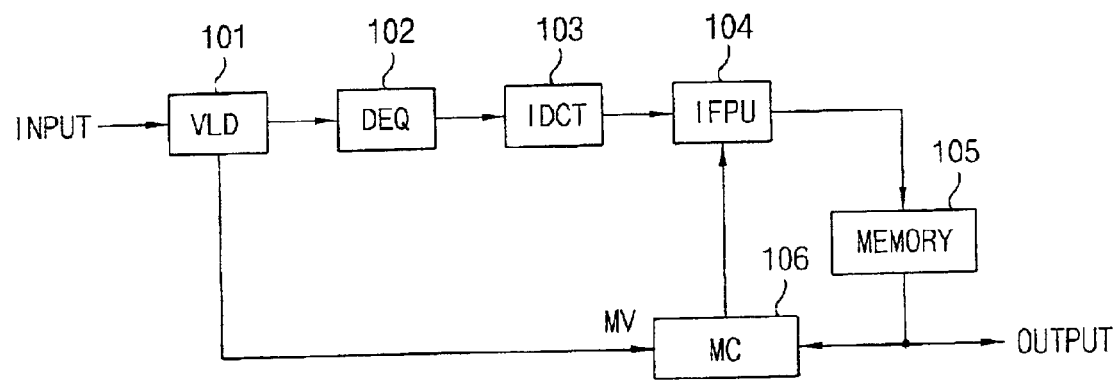
FIG. 1 is a schematic block diagram of an image processing apparatus in accordance with the conventional art.

Video frames contain lots of correlated regions which can be compressed. Since the frames are progressive or interlaced, compression done on horizontal direction produces far less artifacts after decompression compared to applying compression on vertical direction or 2-Dimentional direction. The higher the compression ration goes up, the more the high frequency components are hurt and edges become corrupted. DPCM, Adaptive DPCM (ADPCM) and Vector Quantization methods could corrupt the edges even though they perform well in moderate compression ratios.

Therefore, it becomes clear that an edge or high frequency preserving compression methods are necessary in order to keep the quality of the decompressed video frames. Also in texture regions where the details of the images are inherent, the previous methods tend to smooth out the detail and cause error propagation or prediction drifts.

There were also other methods which reduced these artifacts but were much more complicated since they used adaptive quantization and variable length encoding for recompression. In ADPCM method, a separated header information was stored for random access purposed for motion compensation, increasing the complexity of the decoder. The Wavelet Transform applied here keeps the complexity lower than the ADPCM method while producing near lossless visual quality, even on the texture or edge regions.

The basic concept of the present invention is about recompressing the decoded frames before storing them to the external frame memory. It reduces the amount of storages necessary by compressing the decoded I, P, and B pictures. It also reduces the bandwidth necessary in reading and writing the frame data stored in the memory for motion compensation and display purposes. The bandwidth goes up when decoding the High Definition (HD) video sequences Especially, when the motion compensation block is activated. Motion compensation block has to access data by 16×8 or 16×16 pel basis at a random position given by the motion vector obtained from the bitstreams. Thus these effects must be given a full consideration when designing a real-time VLSI.

Since, the MPEG uses I, P, and B pictures for encoding motion pictures, the motion estimation error propagates from an I picture to next I picture when recompression is adopted. Therefore, it is necessary to build a compression system which minimizes error propagation. Reducing memory access bandwidth along with memory size is very critical in consumer electronics since they are directly related to product cost. If we reduce the bandwidth then we can use cheaper and common synchronous DRAM (SDRAM) for the product instead of using comparatively expensive Rambus DRAM (RDRAM). The present invention keeps a good balance between the compression ratio, bandwidth usages, random accessibility for motion compensation, error propagation and cost effectiveness of the product at no visual degradation or negligible degradation in PSNR wise.

[Embodiment]

The wavelet transform used in the compression has excellent energy compacting capability. It decomposes the high frequency and low frequency components into 2 different frequency subbands, where entropy of the decomposed high frequency coefficients is reduced therefore enabling a CODEC to use less bits for encoding. Also, more high frequency components become zero or near zero value by quantization thus introducing only few number of non zero values in the high frequency subband. This high frequency subband can be efficiently coded via simple quantization, quantization using preconstructed table, vector quantization or variable length coding. Compression ratio can be controlled using quantization step size and it can also be frequency subbands forming low-low, low-high, and high subbands. This kind of continuous decomposition of the low frequency component brings down example of a continuous decomposition.

Figure 2:
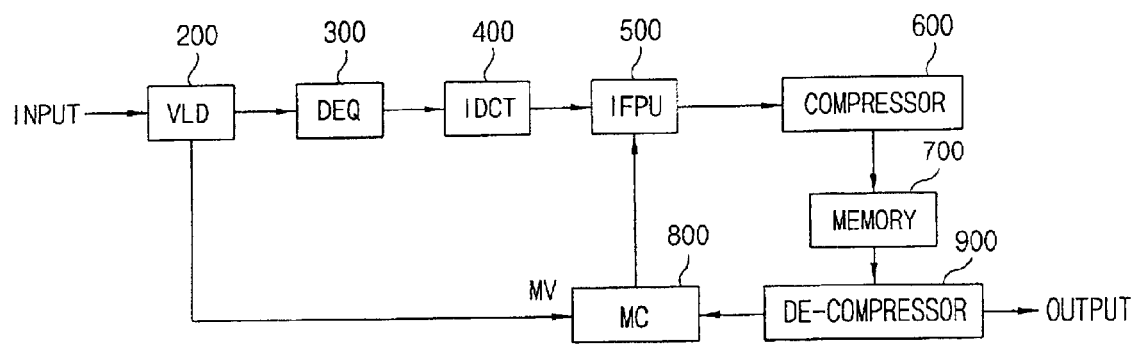
FIG. 2 is a schematic block diagram of an apparatus for motion compensation adaptive image process in accordance with the present invention.

FIG. 2 is a schematic block diagram of an apparatus for motion compensation adaptive image processing in accordance with the present invention.

The apparatus for motion compensation adaptive image processing in accordance with the present invention, which processes an image data received from a external source, stores the processed image data and restores the stored data to the received image data, comprises a variable length decoder 200 for decoding the image data (bitstreams) to have variable length and outputting variable length decoded image data and motion vector signal, an image compensating unit 800 for generating a motion compensation information to compensate the received image data based the motion vector signal, a dequantizer 300 for dequantizing the variable length decoded image data, an inverse discrete cosine transform (IDCT) unit 400 for inverse discrete cosine transforming the variable length decoded image data, an image frame processing unit 500 for processing the inverse discrete cosine transformed data based on the motion compensation information and outputting the processed image data as a frame unit, an image compressor 600 for receiving the processed image data from the image frame processing unit 500, analyzing the image data having relatively high frequency component and image data having relatively low frequency components, allocating a predetermined bits into the analyzed image data and compressing/coding the image data including the allocated bits, a memory 700 storing the compressed/coded image data, and an image decompressor 900 decoding the stored image data, restoring the received image data based on the decoded image data and outputting the restored image data to the motion compensation unit 800 and an external display (not shown).

Figure 3A:
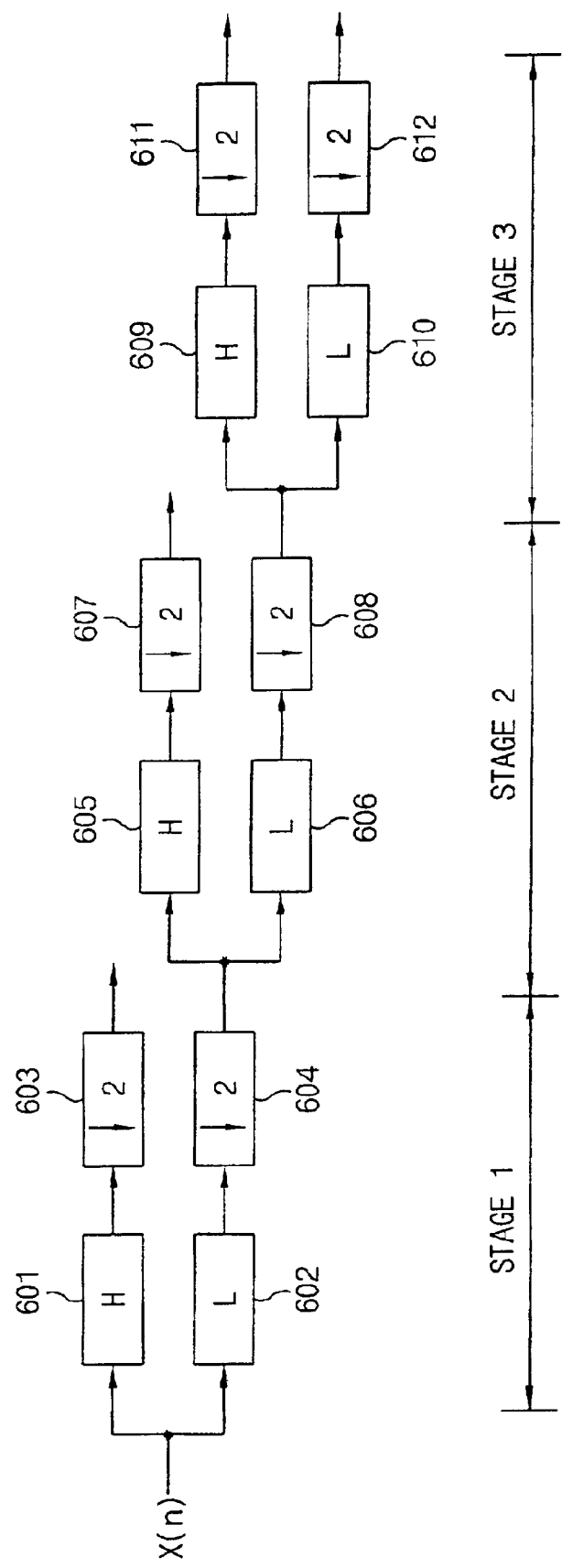
FIG. 3A is a schematic block diagram to explain a concept of image compression method in accordance with the present invention.

FIG. 3A is a schematic block diagram to explain a concept of image compression method in accordance with the present invention.

The image compressor 600 comprises high pass filters 601, 605 and 609 for high pass filtering the image data received from the image frame processing unit 500 and analyzing image data having high frequency components, low pass filters 602, 606 and 610 for low pass filtering the image data received from the image frame processing unit 500 and analyzing image data having low frequency components, and decimeters 603, 604, 607, 608, 611, and 612 for down sampling the outputs of the filters.

Here, input image data X(n) is divided into high frequency component and low frequency component by a high pass filter 601 and a low pass filter 602. And decimeters 603 and 604 down-sample each output of the filters 601 and 602. Assuming the above process as one stage, i e stage 1, the image data having low frequency component is further divided into high and low frequency components by a high pass filter 605 and a low pass filter 606 and down-sampled by decimators 607 and 608. Therefore, the input image data X(n) is processed by the several stages as mentioned above, for example, stage 1, stage 2, and stage 3, . . . as shown in FIG. 3A.

As shown, in each stage the processed image data is continuously processed by the low pass filter and the decimeter.

Accordingly, the apparatus for motion compensation adaptive image process in accordance with compresses image data, especially to the low bandwidth.

Figure 3B:
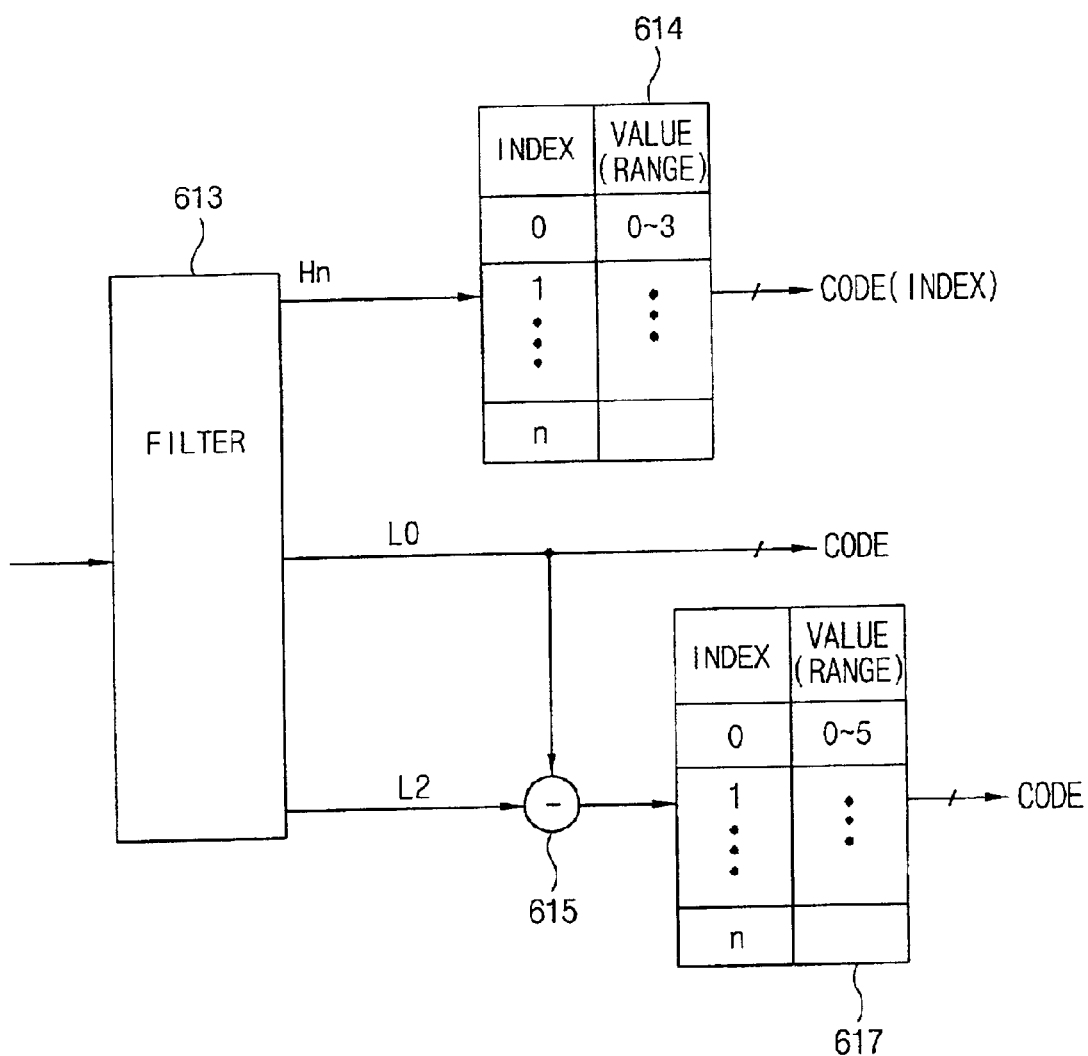
FIG. 3B is depicted in detail a schematic block diagram of compressor of an apparatus for motion compensation adaptive image process in accordance with the present invention.

FIG. 3B is depicted in detail a schematic block diagram of compressor of an apparatus for motion compensation adaptive image process in accordance with the present invention The filter (613) of the image compressor analyzes the processing image data into image data having frequency components, Hn, and low frequency components, L0 and L2. Then the image data having frequency components is coded based on a coding table 614. The image data having first low frequency components L0 is transmitted without processing as a code, and the image data having second low frequency components L2 is subtracted from the image data having the first low frequency components and the result is coded based on a coding table 617. That is, when the image data is mapped its value into a range of the coding tables, 614 and 617, a index corresponding to the range is outputted from the coding tables 614 and 617, as a code.

Accordingly, the input image data are analyzed high frequency components and low frequency components and effectively compressed and coded.

It will now be explained the restoration of the image data with FIGS. 4A and 4B.

Figure 4A:
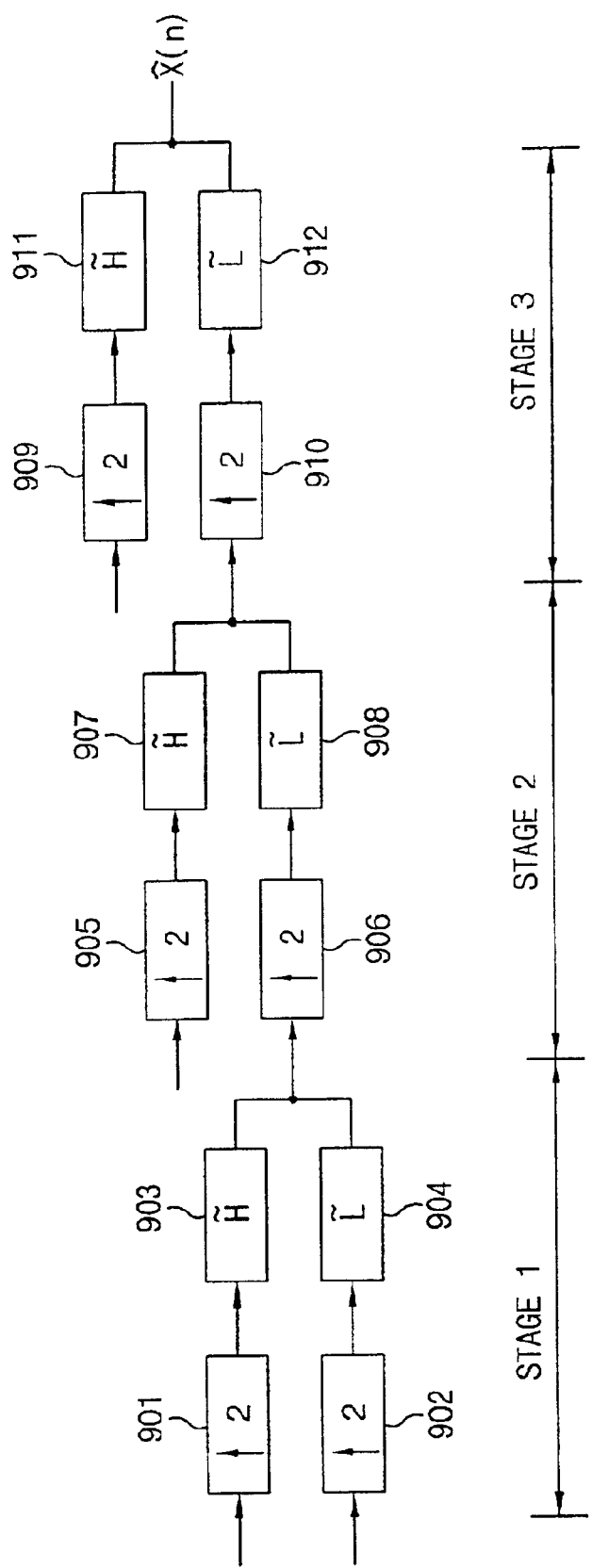
FIG. 4A is a schematic block diagram to explain a concept of image decompression method in accordance with the present invention.

FIG. 4A is a schematic block diagram to explain a concept of image decompression method in accordance with the present invention.

The image decompressor 900 comprises inverse decimeters 901, 902, 905, 906, 909, and 912 for upsampling the compressed/coded image data stored in the memory 700 and high pass and low pass filtering the upsampled image data by the high pass filters 903, 907 and 911 and the low pass filters 904, 908, and 912, respectively.

Here, output image data $\hat{X}(n)$ generated after processing the compressed/coded image data stored in the memory 700 are upsampled by inverse decimeters 901 and 902. The upsampled image data are divided into high frequency component and low frequency component by a high pass filter 903 and a low pass filter 904. Assuming the above process as one stage, i.e. stage 1, the image data having low frequency component is further upsampled by inverse decimators 905 and 906 and divided into high and low frequency components by a high pass filter 907 and a low pass filter 908. Therefore, the output image data $\hat{X}(n)$ is processed by the several stages as mentioned above, for example, stage 1, stage 2, and stage 3, . . . as shown in FIG. 4A.

Figure 4B:
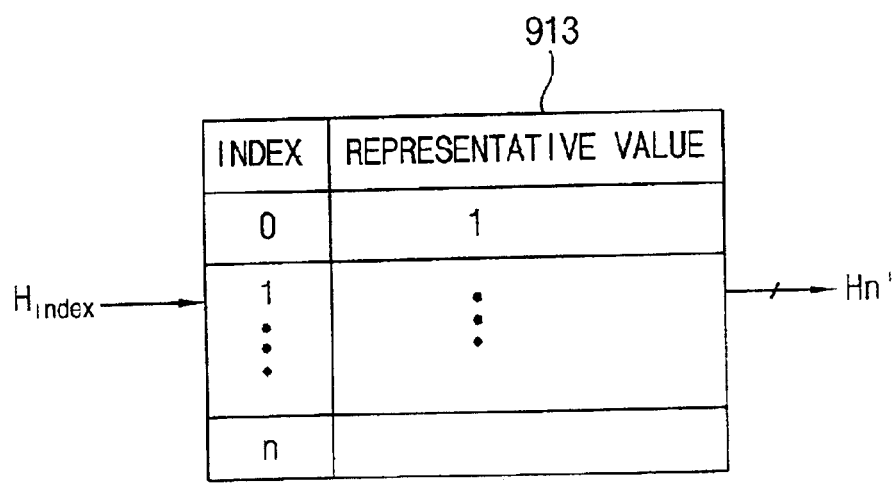
FIG. 4B is depicted in detail a schematic block diagram of decompressor of an apparatus for motion compensation adaptive image process in accordance with the present invention.
Figure 4B:
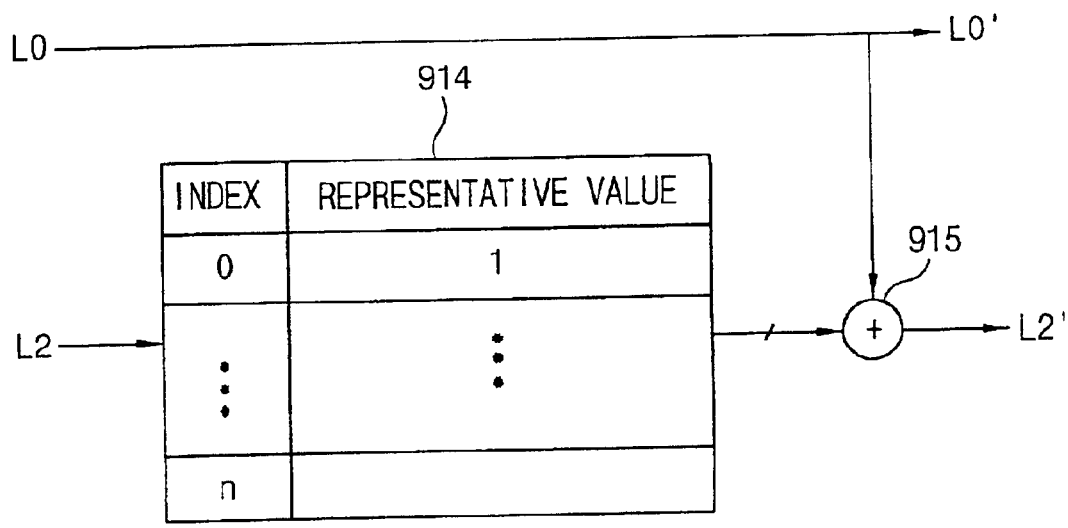

FIG. 4B is depicted in detail a schematic block diagram of decompressor of an apparatus for motion compensation adaptive image process in accordance with the present invention.

The image data having high frequency components of the compressing/coding image data stored in the memory 700 is restored referring to a coding table 913 of the decompressor 900 and the image data having low frequency components is restored referring to a coding table 914. That is, the coding table 913 is to restore the image data having high frequency components by decoding and outputting a representative value Hn' corresponding to the index of the image data $H_{index}$ which is outputted from the coding table 614, as a code, shown as FIG. 3B.

Also, the image data having first low frequency components L0 is transmitted without processing to the external display and, regarding to the image data having second low frequency components L2, when it is coded at the coding table 914 and outputted a representative value, the adder 915 adds the representative and the image data having first low frequency components and outputs the added result L2'.

Accordingly, the decompressor of the apparatus in accordance with the present invention restore the image data.

The operation of the present invention is explained in detail as follows:

The reconstruction of the signal is an exact inverse procedure of the decomposition and is shown in FIGS. 4A and 4B, where the L,H,$\tilde{L}$ and $\tilde{H}$ are decomposition and reconstruction filter set. For, 2 tap filters, the coefficients are given as L={$C_0, C_1, C_2, -C_3$} and H,$\tilde{L}$ and $\tilde{H}$ are achieved as follows, where n={0, 1, 2, 3 }.

$$H(n)=(-1)^n L(3-n) \quad (1)$$

$$\tilde{L}(n)=L(3-n) \quad (2)$$

$$\tilde{H}(n)=H(3-n) \quad (3)$$

The following are the coefficients for the Daubechie's 4 tap compact filters for decomposition and reconstruction.

$$L(n)=\{C_0, C_1, C_2, -C_3\} \quad (4)$$

$$H(n)=\{-C_3, -C_2, C_1, -C_0\} \quad (5)$$

$$\tilde{L}(n)=\{-C_3, C_2, C_1, C_0\} \quad (6)$$

$$\tilde{H}(n)=\{-C0,C1,-C2,-C3\} \quad (7)$$

Theoretically, image is sub-divided based on a block size of m×n, where m is the number of pixels in the horizontal direction and n is the number of lines in the vertical direction. Compression can be performed on the pre-divided sub-block basis for luminance, Cb and Cr chrominance components for I, P and B pictures.

Let X be a vector to be coded in a digital picture where the picture size is H×V, where H is the horizontal size and V is the vertical size of the picture. The size of the vector can be m×n, where m is the horizontal size and the n is the vertical size of the vector. The compression will be performed first on the luminance block and then on the chrominance block.

As stated before, compression ratio can be varied by controlling the decomposition layer shown in FIGS. 3A and 3B. Compression ratio can also be modified by applying different quantization factor for the low and high frequency coefficients. High compression ratio of low frequency components is less desirable since they tend to cause more error as the signal is reconstructed.

The quantizer can be designed in many different ways. One method could be to analyze the statistics of the sub-blocks after decomposition. The statistics would look something like the Laplacian. And optimal non-linear quantizer based on the statistics can be designed. A non-linear quantizer is very useful when used with the transform type of compression method. Using the wavelet transform, we are able to compact more energy to low frequency coefficients and less energy exits on the high frequency coefficients enabling us to use also liner quantizer. Therefore, both linear and non-linear quantizer can be used, since most of the energy is already compactly incorporated in the low frequency coefficients.

To facilitate easy pixel access for random access application such as motion compensation error and error drift, an example using wavelet transform with compression ratio of 25%, i.e., 4:3 compression is given as an example.

FIG. 2 shows where this compression algorithm can be applied in a real-time VLSI MPEG decoder.

The first step of the compression is to apply Wavelet Transform on the block of 4 pixels, i.e. the sub-block size of the compression set is 4×1 pels. The compression is done horizontally since the input source can be both progressive and interlaced, so compressing horizontally could cause less error to occur. Also, vertical compression is not preferred for display purposes since display would read the data horizontally and top to bottom from the stored frame memory. The ratio of 4:3 given here is an example can be achieved easily by coding 32 bits of data with 23 bits. The second step is to apply Wavelet Transform on 4 pixels. The wavelet transform is a convolution process of the pixel data and wavelet filters given above. L and H are analysis filters an $\tilde{L}$ and $\tilde{H}$ are reconstruction filters. Wavelet decomposition is done as follows and is also depicted in FIGS. 3A and 3B.

$$X_{low}(n) = \sum_k f(n-2k)L(k) \quad (8)$$

$$X_{high}(h) = \sum_k f(n-2k)H(k) \quad (9)$$

where, n=0, 1, 2, 3 and f ( ) is the block of data to be decomposed.

Multiresolution decomposition using Wavelet Transform and decimation by a factor of 2 would give 2 coefficients of low frequency components and 2 coefficients of high frequency components.

The third step would be to quantize the 2 low and 2 high frequency components are average of 7 bits for low frequency components and 5 bits each for high frequency components. For the first low frequency component is encoded with 8 bits and second low frequency component is encoded in 6 bits. In the example given here, the low frequency components and high frequency components are all double precision data. Since, the first low frequency components must be between 0 and 255 to be saved in 8 bit data, it is rounded to the nearest integer as follows.

$$Y_{low}(n)=(\text{int})\{X_{low}(n)+a\} \quad (10)$$

where, $X_{low}(n)$ is the decomposition result and $Y_{low}(n)$ is the quantized value. A is −0.5 when $Y_{low}(n)<0$ and 0.5 when $Y_{low}(n)>0$. After the rounding operation, saturation is performed on $Y_{low}(n)$, i.,e.

$$Z_{low}(n) = \begin{cases} 255 & \text{if } Y_{low}(n) > 255 \\ 0 & \text{if } Y_{low}(n) < 0 \\ Y_{low}(n) & \text{otherwise} \end{cases} \quad (11)$$

The low frequency components use DPCM method to allocate 8 and 6 bit each for the first and second low frequency component. Prediction is a table lookup process for the second low frequency component.

$$Z'_{low}(2)=Z_{low}(2)-Z_{low}(0) \quad (12)$$

and $Z'_{low}(n)$ is assigned with a predefined code using 6 bits.

The high frequency components are now quantized. The quantization performed her can be considered as a combination of non-linear quantization and linear quantization. Since, the high frequency components must fall between 127 and −128 simple rounding operation is performed first on the high frequency components.

$$Y_{high}(n)=(\text{int})(X_{high}(n)+a) \quad (13)$$

where, $X_{high}(n)$ is the decomposition result and $Y_{high}(n)$ is the quantized value. A is −0.5 when $Y_{high}(n)<0$ and 0.5 when $Y_{high}(n)>0$. After the rounding operation, saturation is performed on $Y_{high}(n)$, i.e.

$$Z_{high}(n) = \begin{cases} 127 & \text{if } Y_{high}(n) > 127 \\ 0 & \text{if } Y_{high}(n) < -128 \\ Y_{high}(n) & \text{otherwise} \end{cases} \quad (14)$$

Then, each $Z_{high}(n)$ is quantized to 5 bits using a different pre-defined quantization table.

The reconstruction is very simple, and it is an inverse procedure of the decomposition process. The reconstruction procedure is depicted in FIG. 3 and is as follows. The first step is to dequantize $Z_{high}$ (n) values by a table lookup. An 8 bit data is recovered for each high frequency components. The first low frequency coefficients are already in 8 bits, and second low frequency component is reconstructed by a table lookup process, which is $\tilde{Z}'_{low}(2)$, and adding $\tilde{Z}'_{low}(2)$ to reconstructed value to the first low frequency coefficient, $\tilde{Z}_{low}(0) = Z_{low}(0)$, and performing wavelet transform.

$$\tilde{Z}_{low}(2) = \tilde{Z}'_{low}(2) + \tilde{Z}'_{low}(0) \quad (15)$$

Inverse wavelet transform is performed on $\tilde{Z}'_{low}(n)$ and $\tilde{Z}'_{high}(n)$ by using $\tilde{L}$ and $\tilde{H}$ filters respectively. Interpolated, 'zero' values before convolution. The low frequency components are reconstructed from convolution of $Z_{low}(n)$ and $\tilde{L}$, and high frequency components are reconstructed from convolution of $Z_{high}(n)$ and $\tilde{H}$.

$$\tilde{Y}_{low}(n) = \tilde{Z}_{low}(n-k)\tilde{L}(n-k) \quad (16)$$

$$\tilde{Y}_{high}(n) = \tilde{Z}_{high}(n-k)\tilde{H}(n-k) \quad (17)$$

After the $\tilde{Y}_{low}$ and $\tilde{Y}_{high}$ are reconstructed, these two values are summed and multiplied by factor of 2. This multiplication factor of 2 is due to upsampling factor which is 2.

$$\tilde{X}(n) = 2(\tilde{Y}_{low}(n) + \tilde{Y}_{high}(n)) \quad (18)$$

Finally, after the $\tilde{X}(n)$ is reconstructed from $\tilde{Y}_{low}$ and $\tilde{Y}_{high}$, it is rounded to the nearest integer value and saturated to lie between 0 and 255.

$$\tilde{X}(n) = (ing) \begin{cases} \tilde{X}(n) + 0.5 & \text{if } \tilde{X}(n) > 0 \\ \tilde{X}(n) - 0.5 & \text{if } \tilde{X}(n) < 0 \\ \tilde{X}(n) & \text{otherwise} \end{cases} \quad (19)$$

$$\tilde{X}(n) = \begin{cases} 255 & \text{if } \tilde{X}(n) > 255 \\ 0 & \text{if } \tilde{X}(n) < 0 \\ \tilde{X}(n) & \text{otherwise} \end{cases} \quad (20)$$

Therefore, in this patent, a video frame compression method to differentiate low and high frequency components to optimal compress pixel data to facilitate random access, minimize error propagation, with a moderate compression ratio for a real-time VLSI implementation has been shown.

What is claimed is:

1. A method for motion compensation adaptive image processing, which processes an image data received from an external source, stores the processed image data and restores the stored data to the received image data, comprising:

dividing the received image data into at least one relatively high frequency component and at least one relatively low frequency component;

compressing/coding the image data having the relatively high frequency component and relatively low frequency component by allocating predetermined bits, said compressing/coding including coding the relatively high frequency component independently from the relatively low frequency component; and decoding the coded image data and restoring the received image data based on the decoded image data, wherein compressing/coding compresses and codes the image data of sub-blocks (4×1 pel, 32 bits) as 24 bits data by coding the image data with the following methods: 1) dividing the sub-blocks into two image data having high frequency components and low frequency components by Wavelet Transform, then coding two image data having two high frequency components by allocating five bits, respectively; 2) coding the first one of the two image data having the low frequency components as eight bits data; and 3) coding the second one of the two image data having the low frequency components as six bits data.

2. The method of claim 1, wherein the image data is divided into the relatively high and low frequency components by Wavelet Transform.

3. The method of claim 1, wherein the image data having relatively low frequency components is divided repeatedly into image data having relatively higher and lower frequency components of which frequencies are lower than that of the image data previously divided.

4. The method of claim 1, wherein dividing the received image data comprises high pass and low pass filtering image data and downsampling the high and low pass filtering image data.

5. The method of claim 1, wherein compressing/coding the image data further comprises outputting:

a first code corresponding to a lower value of the relatively low frequency component; and a second code obtained by coding a result of subtracting the lower value from a higher value of the relatively low frequency component.

6. The method of claim 1, wherein compressing/coding the image data further comprises storing the compressed/coded image data.

7. The method of claim 1, wherein the restored image data is obtained by repeatedly performing decoding for as many times as the number of coding was performed for the divided image data.

8. The method of claim 1, wherein decoding/restoring the received image data further comprises outputting a first representative value from a coding table corresponding to a higher value of the relatively low frequency component and a second representative value from a coding table corresponding to the relatively high frequency component.

9. The method of claim 8, further comprising:

an adding the first representative value to a lower value of the relatively low frequency component; and a restoring the received image data based on the first and second representative values.

10. An apparatus for motion compensation adaptive image processing, which processes an image data received from an external source, stores the processed image data and restores the stored data to the received image data, the apparatus comprises:

an image frame processing unit for processing the received image data as frame unit and outputting the processing image data and a motion vector signal;

an image compensating unit for generating a motion compensation information, to compensate the received image data based the motion vector signal and outputting it to the image frame processing unit;

an image compressing unit for dividing the image data into one or more relatively high frequency components and image data having one or more relatively low frequency components, allocating a predetermined bits to the divided image data, and compressing/coding the relatively high frequency components independently from the relatively low frequency components;

a storing unit for storing the compressed/coded image data; and an image restoring unit for decoding the stored compressed/coded image data and restoring the received image data based on the decoded image data, wherein the image compressing unit compresses and codes the image data of sub-blocks (4×1 pel, 32 bits) as 24 bits data by coding the image data with the following methods: 1) dividing the sub-blocks into two image data having high frequency components and low frequency components by Wavelet Transform, then coding two image data having two high frequency components by allocating five bits, respectively; 2) coding the first one of the two image data having the low frequency components as eight bits data; and 3) coding the second one of the two image data having the low frequency components as six bits data.

11. The apparatus of claim 10, wherein the image compressing unit comprises:

a filtering unit for filtering the image data received from the image frame processing unit and outputting the high frequency components and low frequency components based on the filtering image data;

a high frequency coding unit for coding the image data having high frequency components using a coding table; and a low frequency coding unit for coding the image data having low frequency components using a coding table.

12. The apparatus of claim 11, wherein the high frequency coding unit outputs a code corresponding to a value in the coding table, which indexes the image data having high frequency component.

13. The apparatus of claim 11, wherein the high frequency coding unit outputs a code corresponding to a value indexing a range if the high frequency component is in the range.

14. The apparatus of claim 11, wherein the low frequency coding unit outputs a first code corresponding to a first low frequency components and a second code corresponding to a value indexing a result of subtracting the first low frequency component from a second low frequency component using the coding table.

15. The apparatus of claim 10, wherein the image restoring unit comprises:

a filtering unit for dividing the image data stored in the storing unit into the image data having high frequency components and low frequency components; and a decoding unit for decoding the image data having high frequency components and the image data having low frequency components using coding table.

16. The apparatus of claim 15, wherein the decoding unit outputs a representative value indexing the image data having high frequency components stored in the storing unit using the coding table, a first value of the image data having first low frequency components as it is, and a value that the first value is added to a second value coded for the image data having second low frequency components according to the coding table.

17. The apparatus of claim 10, wherein the image frame processing unit comprises:

a variable length coding unit for receiving the image data and coding the received image data to have variable length;

a dequantizing unit for dequantizing the variable length coding image data;

an inverse transform unit for inverse discrete cosine transforming the variable length coded image data; and a frame processing unit for processing the inverse discrete cosine transformed image data based on the motion compensation information and outputting the processed image data as a frame unit.

18. The apparatus of claim 10, wherein the image compressing unit comprises:

a filtering unit for filtering the received image data having subblocks and analyzing the filtered data into image data having high frequency components and image data having low frequency components;

a first coding table for mapping a value of the image data having high frequency components into a index having a range and outputting a code generated after compressing/coding the image data;

a subtracting unit for subtracting the image data having the a low frequency components from the image data having a second low frequency components; and a second coding table for mapping the subtracting value into a index having a range and outputting a code coding the image data having low frequency components.

19. The apparatus of claim 10, wherein the image restoring unit comprises:

a first decoding table for outputting representative value indexing the image data having high frequency components stored in the storing unit using the coding table;

an adding unit for adding a value of the image data having a first low frequency components, and a value of the image data-having a second low frequency components; and a second decoding table for outputting a representative value indexing a code corresponding to the image data having the second low frequency components.

20. An image processing method, comprising:

dividing received image data into high and low frequency components;

allocating predetermined bits to the high and low frequency components;

coding the high frequency components independently from the low frequency components to generate compressed image data; and compressing and coding the image data of sub-blocks (4×1 pel, 32 bits) as 24 bits data by coding the image data with the following methods: 1) dividing the sub-blocks into two image data having high frequency components and low frequency components by Wavelet Transform, then coding two image data having two high frequency components by allocating five bits, respectively; 2) coding the first one of the two image data having the low frequency components as eight bits data; and 3) coding the second one of the two image data having the low frequency components as six bits data.

21. The method of claim 20, wherein coding the high frequency components includes:

using different coding tables to code the high frequency components and the low frequency components.

22. The method of claim 21, wherein coding the high frequency components includes:

outputting an indexed range value from a first coding table corresponding to the high frequency band components;

subtracting first low frequency components from second low frequency components to generate a difference value; and outputting an indexed range value from a second coding table corresponding to the difference value.

23. The method of claim 22, wherein the compressed image data is formed from the index range value from the first coding table, the index range value from the second coding table, and the first low frequency components.

24. The method of claim 20, further comprising:

storing the compressed image data in a storage unit.

25. The method of claim 24, further comprising:

decoding the compressed image data into high and low frequency components;

restoring the received image data from the decoded data, wherein the low and high frequency components are decoded independently from one another.

26. The method of claim 25, wherein decoding the compressed image data includes:

outputting an indexed representative value from a first decoding table for the high frequency components;

outputting an indexed representative value from a second decoding table for first low frequency components; and adding the indexed representative value from the second decoding table and second low frequency components to generate summed data.

27. The method of claim 26, wherein received image data is restored based on the indexed representative value from the first decoding table, the indexed representative value from the second coding table, and the second low frequency components.

* * * * *